United States Patent
Xu et al.

(10) Patent No.: US 11,801,552 B2
(45) Date of Patent: Oct. 31, 2023

(54) DEVICE FOR CONTINUOUS TREATMENT OF MATERIALS CONTAINING VOLATILE COMPONENTS

(71) Applicant: Kunming University of Science and Technology, Yunnan (CN)

(72) Inventors: Baoqiang Xu, Yunnan (CN); Tengteng Shi, Yunnan (CN); Bin Yang, Yunnan (CN); Wenlong Jiang, Yunnan (CN); Yang Tian, Yunnan (CN); Lingxin Kong, Yunnan (CN); Jinyang Zhao, Yunnan (CN); Fei Wang, Yunnan (CN)

(73) Assignee: KUNMING UNIVERSITY OF SCIENCE AND TECHNOLOGY, Yunnan (CN)

( * ) Notice: Subject to any disclaimer, the term of this patent is extended or adjusted under 35 U.S.C. 154(b) by 0 days.

(21) Appl. No.: 17/928,471

(22) PCT Filed: Mar. 24, 2022

(86) PCT No.: PCT/CN2022/082632
§ 371 (c)(1),
(2) Date: Nov. 29, 2022

(87) PCT Pub. No.: WO2022/247423
PCT Pub. Date: Dec. 1, 2022

(65) Prior Publication Data
US 2023/0191478 A1    Jun. 22, 2023

(30) Foreign Application Priority Data
May 28, 2021 (CN) .......................... 202110595029.9

(51) Int. Cl.
*B22D 43/00* (2006.01)
(52) U.S. Cl.
CPC .................................. *B22D 43/007* (2013.01)

(58) Field of Classification Search
CPC .............. B22D 43/007; C10J 2200/156; C10J 2200/154; C10J 2200/00; C10J 3/54; C10J 3/721; F23G 5/027
(Continued)

(56) References Cited

U.S. PATENT DOCUMENTS

| 5,259,863 A * | 11/1993 | Schneider | ................. B09B 3/29 |
|---|---|---|---|
| | | | 75/433 |
| 6,286,443 B1 * | 9/2001 | Fujinami | ................... F23G 5/16 |
| | | | 110/208 |

FOREIGN PATENT DOCUMENTS

| CN | 202529962 | * 11/2012 | .............. C02F 11/10 |
|---|---|---|---|
| CN | 202529962 U | 11/2012 | |

(Continued)

*Primary Examiner* — Scott R Kastler
*Assistant Examiner* — Michael Aboagye
(74) *Attorney, Agent, or Firm* — Kirk A. Wilson; Joseph T. Guy; Patent Filing Specialist Inc.

(57) ABSTRACT

Disclosed is a device for continuous treatment of materials containing volatile components, which belongs to the field of pyrometallurgical equipment. The device includes a feeding unit, a heating unit, a slag raking unit and a slag collecting unit. The feeding unit is configured to feed the materials with a push rod or in a spiral mode. The heating unit is provided with a square furnace body, and a first slag raking port is provided in the lower part of the furnace body. The slag collecting unit is provided with a slag discharging port at the lower portion thereof, is provided with a slag smashing port at the sidewall thereof, and is provided with a viewing port at the top thereof. The slag collecting unit and the heating unit are connected through a pipeline, thus achieving the pressure balance of the whole device during operation.

9 Claims, 6 Drawing Sheets

(58) Field of Classification Search
USPC .................................. 266/107, 207, 208, 252
See application file for complete search history.

(56) References Cited

FOREIGN PATENT DOCUMENTS

| | | | | |
|---|---|---|---|---|
| CN | 104057064 A | | 9/2014 | |
| CN | 206430135 | * | 8/2017 | .......... C10J 2200/00 |
| CN | 108895458 | * | 11/2018 | .......... C10J 2200/00 |
| CN | 208419636 U | | 1/2019 | |
| CN | 109925967 A | | 6/2019 | |
| CN | 111748691 A | | 10/2020 | |
| CN | 212227741 U | | 12/2020 | |
| CN | 113182513 A | | 7/2021 | |
| CN | 215315696 U | | 12/2021 | |
| JP | 2002147723 A | | 5/2002 | |
| JP | 2003232593 | * | 8/2003 | ............. F27D 15/00 |
| JP | 2007248007 A | | 9/2007 | |

\* cited by examiner

DEVICE FOR CONTINUOUS TREATMENT OF MATERIALS CONTAINING VOLATILE COMPONENTS

CROSS-REFERENCE TO RELATED APPLICATION

This patent application claims the priority of Chinese Patent Application No. 202110595029.9 filed with the China National Intellectual Property Administration on May 28, 2021, entitled "Device for continuous treatment of materials containing volatile components", the disclosure of which is incorporated by reference in this present application.

TECHNICAL FIELD

The present disclosure belongs to the field of pyrometallurgical equipment, and in particular relates to a device for continuous treatment of materials containing volatile components.

BACKGROUND

At present, in the field of pyrometallurgy, for materials with low boiling point and easy slagging characteristics, the treatment scale in industry is enlarged by mostly increasing the volume of the heating furnace, which results in the problems of large space occupation, high investment cost, low heating efficiency of the heating furnace and the like. Further, this work needs the heating furnace to operate intermittently, and thus the heating furnace must be cleaned every a short time interval, thus leading to short operation cycle.

Vacuum metallurgy has the advantages of being environmentally friendly, high in production efficiency and the like, especially for the treatment of nonferrous metallurgical hazardous waste such as arsenic-containing materials. The vacuum metallurgy has obvious advantages compared with a traditional pyrometallurgy technology. However, when the operation for Vacuum metallurgy is carried out under the vacuum condition, the requirement standard for equipment is higher, and large-scale equipment is not beneficial to the implementation of vacuum atmosphere.

With continuous progress of smelting technology, there is an urgent need to develop innovative equipment with low investment cost, large treatment scale and environmental friendliness.

SUMMARY

Aiming at the problem existing in industrial equipment operation, an objective of some embodiments is to provide a device for continuous treatment of materials containing volatile components, which has the characteristics of being simple in structure and long in operation cycle. Further, this device may serve as front-end supporting equipment for treating one or more materials in industry.

In accordance with the present disclosure, a device for continuous treatment of materials containing volatile components, includes a feeding unit, a heating unit, a slag raking unit, and a slag collecting unit, where the heating unit includes a heating furnace, a charging port is formed in a top of the heating furnace, and a discharge port of the feeding unit communicates with the charging port of the heating unit; a gas outlet 4 is formed in an upper portion of a first sidewall of the heating unit, a first slag raking port 18 is formed in a lower portion of a second sidewall of the heating unit, and the second sidewall is opposite to the gas outlet 4; and the gas outlet 4 is configured to communicate with a volatile component collecting device.

The slag collecting unit includes a slag collecting bin 13, a slag discharging port 14 and a slag smashing port 15; the slag discharging port 14 is arranged in a lower portion of the slag collecting bin 13, a first side of the slag collecting bin 13 is provided with the slag smashing port 15, and a second slag raking port 19 is formed in an upper portion of the first side of the slag collecting bin 13; the second slag raking port 19 of the slag collecting unit fixedly communicates with the first slag raking port 18 of the heating unit; the slag collecting unit communicates with the heating unit through a pipeline; and the pipeline is provided with a vacuum valve 16 and a KF tee joint 11. Therefore, the pressure balance between the slag collecting unit and the heating unit can be achieved by externally connecting a vacuum pump or opening a valve.

The slag raking unit includes a first raking plate 7, a second raking plate 8 and a raking rod 9; the first raking plate 7 and the second raking plate 8 are detachably fixed to the raking rod 9, the first raking plate 7 is located in the heating unit, the second raking plate 8 is located in the slag collecting unit, and an end of the raking rod 9 is configured to be connected to a transmission device 17; the heating unit is provided with two supporting plates 5 for supporting the first raking plate 7; when the slag raking unit is out of use, the first raking plate 7 is configured to be located on a rightmost side of the heating unit, and the second raking plate 8 is configured to cover the second slag raking port 19 and isolate the slag collecting unit from the heating unit; the raking rod 9 of the slag raking unit is connected to a second sidewall of the slag collecting bin 13 by means of a dynamic seal 10.

Preferably, in accordance with the present disclosure, the feeding unit is configured to feed the materials in manner of using a push rod or in a spiral manner.

Preferably, in accordance with the present disclosure, the feeding unit includes a motor 1, a conveying rod 2, a discharging pipe 3, a housing 20 and a feeding port 21; the motor 1 is connected to the conveying rod 2, the conveying rod 2 is located inside the housing 20, a top side of the housing 20 is provided with the feeding port 21, and a portion of a lower side of the housing 20 communicates with a top end of the heating unit through the discharging pipe 3; the conveying rod 2 is the push rod or a screw rod, and supporting bearings are arranged at two ends of the conveying rod 2; and an opening in a tail end, which is connected to the heating unit, of the discharging pipe 3 is enlarged, so as to prevent of causing clogging of the discharging pipe 3 when the vapor rises and condenses at the tail end.

Preferably, in accordance with the present disclosure, the heating furnace of the heating unit is square and is configured to be externally heated, thus facilitating the heating of resistance wires and combustion gas such as natural gas. And a lining of the heating furnace is made of stainless steel, corundum filler or ceramic refractory brick materials.

Preferably, in accordance with the present disclosure, the first slag raking port 18 and the second slag raking port 19 are square; the first slag raking port 18 extends into the second slag raking port 19 and is fixedly connected to the second slag raking port 19 by means of a slag raking port flange 6, a connecting portion between the first slag raking port 18 and the second slag raking port 19 is sealed with a rubber ring.

Preferably, in accordance with the present disclosure, a third sidewall of the slag collecting bin 13 has a predetermined inclination, a viewing port 12 is formed in a top of the slag collecting bin 13, and a heat insulation plate is arranged on the slag discharging port 14, and the heat insulation plate is configured to be taken off during slag discharging.

Preferably, in accordance with the present disclosure, an area of the second raking plate 8 is greater than an area of the first raking plate 7, while a thickness of the first raking plate 7 is greater than a thickness of the second raking plate 8; a right side of the first raking plate 7 and a left side of the second raking plate 8 are both provided with rib structures respectively, and each of the area of the first raking plate 7, so as to prevent severe deformation of the raking plates during long-term operation. And the area of the second raking plate 8 is greater than an area of the slag raking port.

Furthermore, a connecting portion of both the pipeline and the slag collecting unit is at a side, away from the heating unit, of the viewing port 12.

Compared with the prior art, some embodiments have the following advantages.

The device disclosed by the present disclosure is simple in structure, reasonable in design, and capable of achieving automatic and continuous production and operation. After materials are conveyed into the heating unit by a feeding unit, a heating system is started, and the materials can also be fed during heating. Further, the volatile substances enter downstream supporting equipment through the gas outlet in the side edge of the heating unit in a steam form. After one cycle, the valve on the pipeline between the heating unit and the slag collecting unit is opened or a vacuum pump configured for the slag collecting unit is directly started to maintain the pressure balance between the slag collecting unit and the heating unit. Residual slag produced in the heating unit enters the slag collecting unit through the operation of the slag raking unit. The device provided by some embodiments can work under normal pressure and vacuum, has the characteristics of high production efficiency, environmental friendliness and the like. In addition, this device is applicable to the recovery of secondary resources of nonferrous smelting and pretreatment of raw materials.

In the figures: 1 motor; 2 conveying rod; 3 discharging pipe; 4 gas outlet; 5 supporting plate; 6 slag raking port flange; 7 first raking plate; 8 second raking plate; 9 raking rod; 10 dynamic seal; 11 KF tee joint; 12 viewing port; 13 slag collecting bin; 14 slag discharging port; 15 slag smashing port; 16 vacuum valve; 17 transmission device; 18 first slag raking port; 19 second slag raking port; 20 housing; 21 feeding port.

DETAILED DESCRIPTION OF THE EMBODIMENTS

The present disclosure is further described in detail below with reference to specific embodiments, but the scope of the present disclosure is not limited thereto.

EMBODIMENT I

Figure 1:
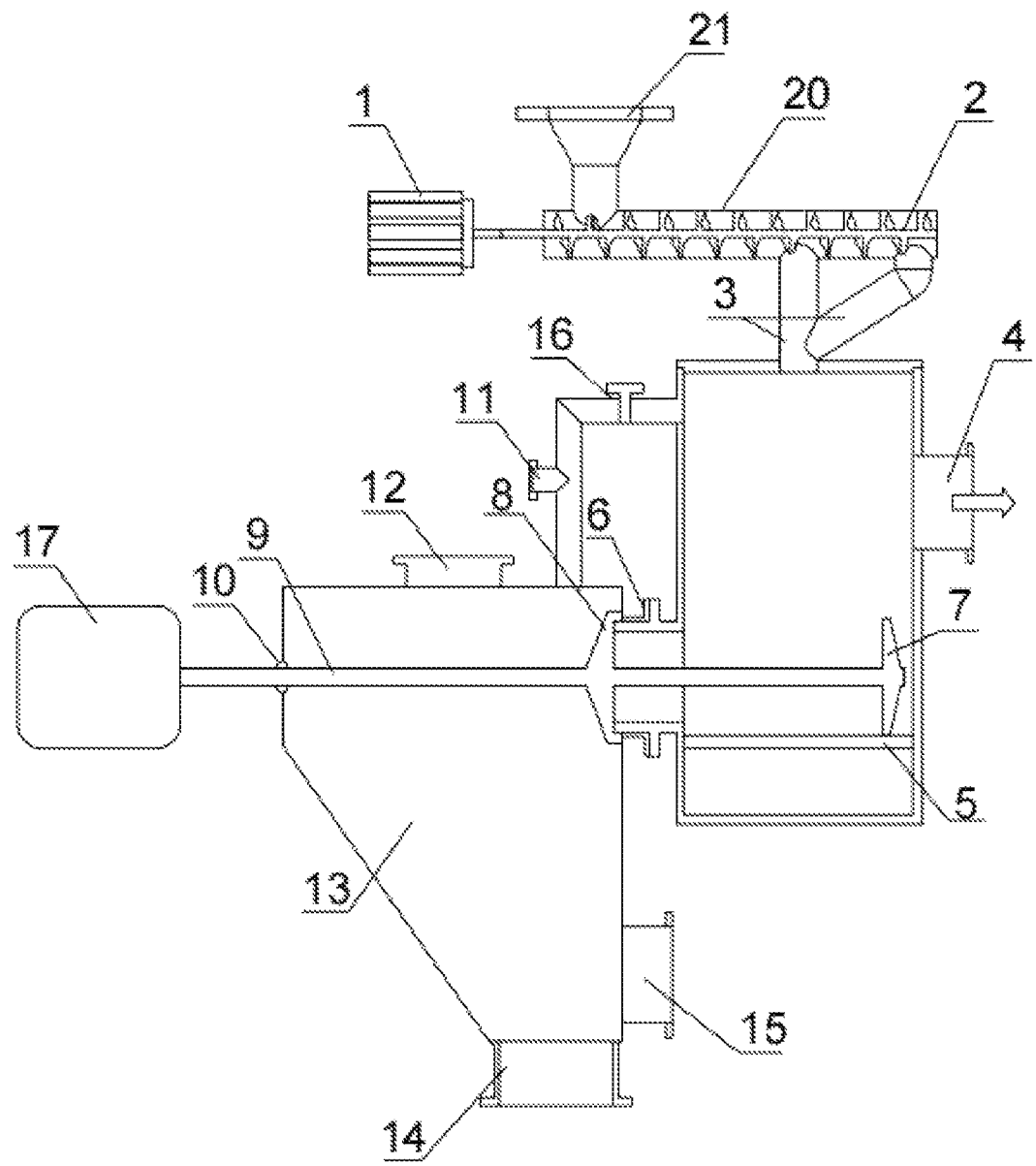
FIG. 1 is a schematic diagram of a structure of a device for continuous treatment of materials containing volatile components in accordance with an embodiment of the present disclosure.
Figure 2:
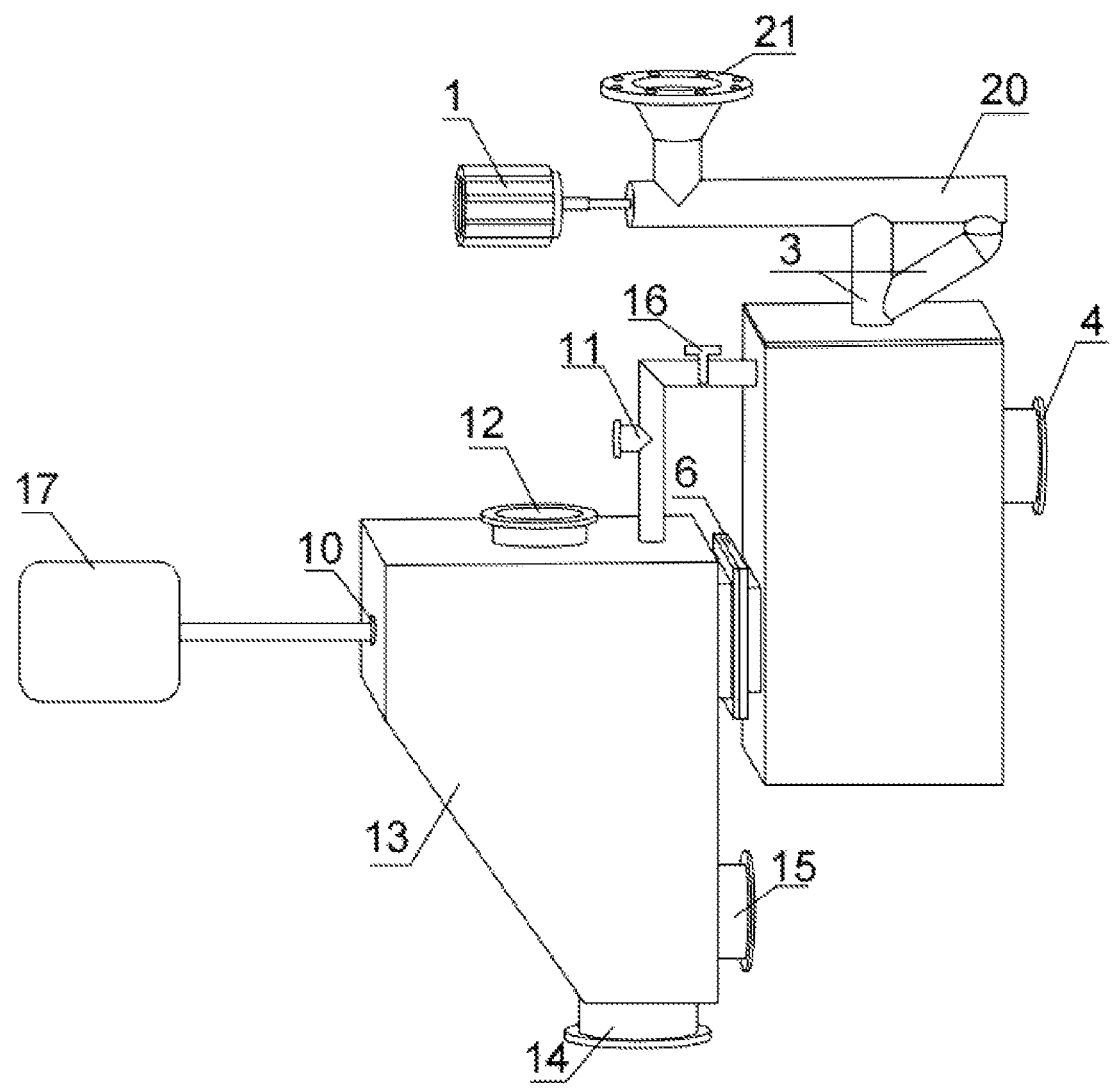
FIG. 2 is a side view of the whole device for continuous treatment of materials containing volatile components in accordance with an embodiment of the present disclosure.
Figure 3:
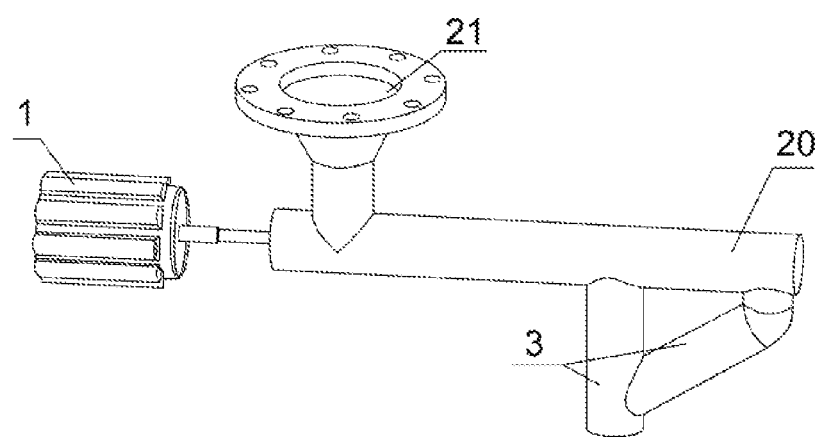
FIG. 3 is a schematic diagram of a feeding unit in accordance with an embodiment of the present disclosure.
Figure 4:
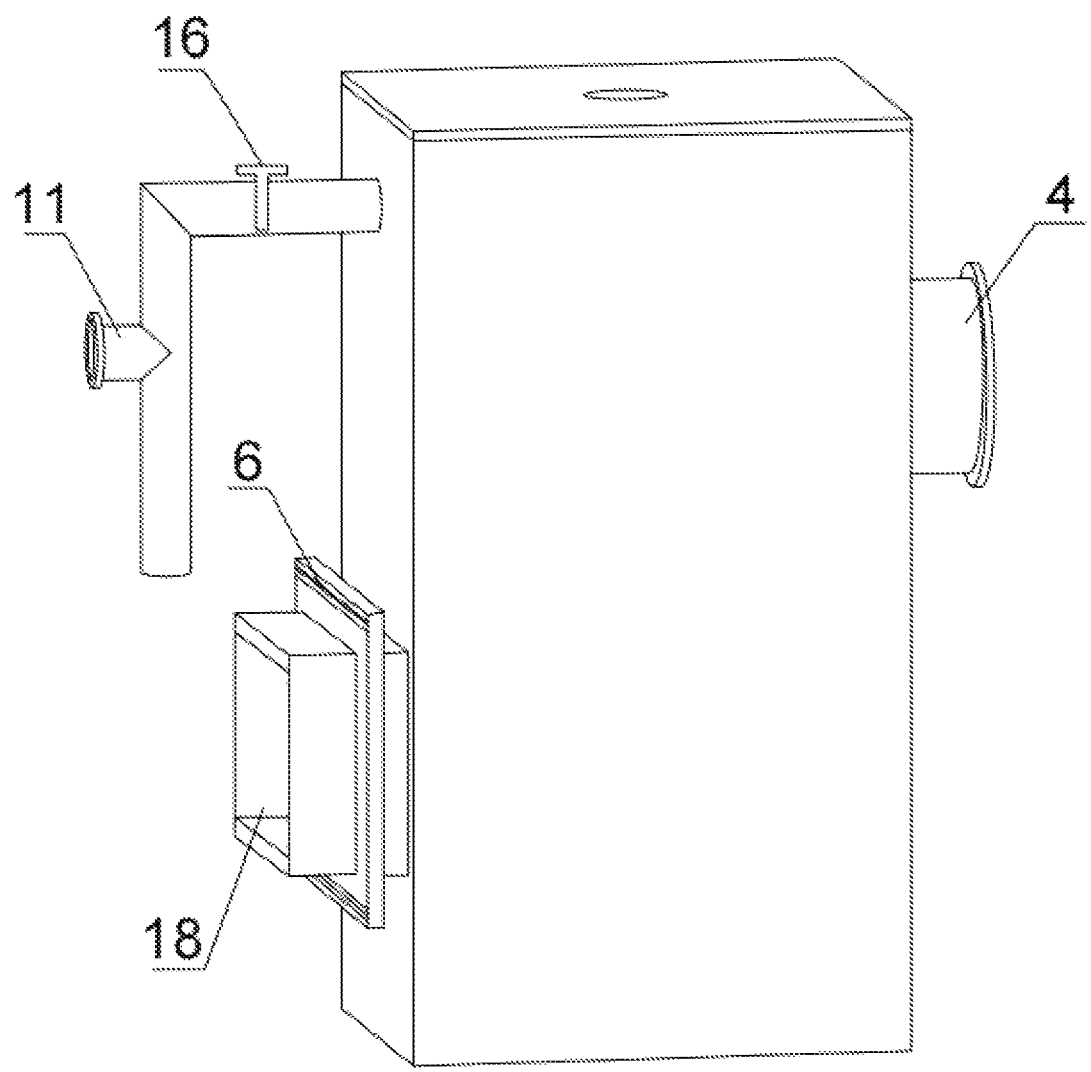
FIG. 4 is a schematic diagram of a heating unit in accordance with an embodiment of the present disclosure.
Figure 5:
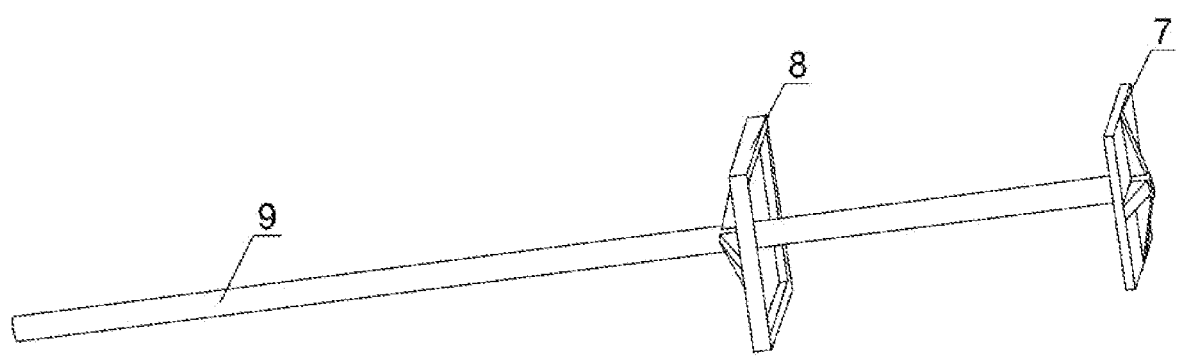
FIG. 5 is a schematic diagram of a slag raking unit in accordance with an embodiment of the present disclosure.
Figure 6:
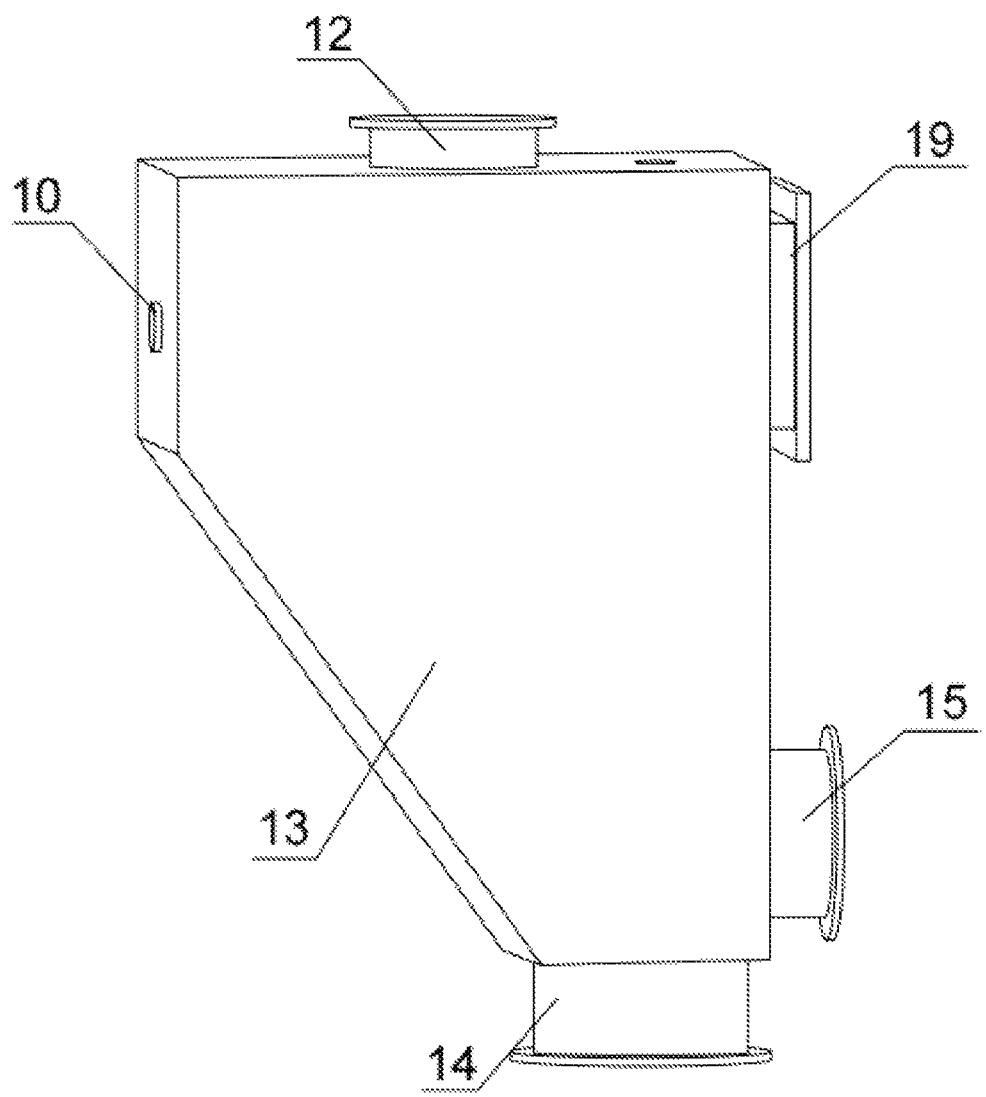
FIG. 6 is a schematic diagram of a slag collecting unit in accordance with an embodiment of the present disclosure.

A device for continuous treatment of materials containing volatile components is shown in FIGS. 1-6. The device includes a feeding unit, a heating unit, a slag raking unit, and a slag collecting unit, where the heating unit includes a heating furnace, a charging port is formed in a top of the heating furnace, and a discharge port of the feeding unit communicates with the charging port of the heating unit; a gas outlet 4 is formed in an upper portion of a first sidewall of the heating unit, a first slag raking port 18 is formed in a lower portion of a second sidewall of the heating unit, and the second sidewall is opposite to the gas outlet 4; and the gas outlet 4 is configured to communicate with a volatile component collecting device. The slag collecting unit includes a slag collecting bin 13, a slag discharging port 14 and a slag smashing port 15; the slag discharging port 14 is arranged in a lower portion of the slag collecting bin 13, a first side of the slag collecting bin 13 is provided with the slag smashing port 15, and a second slag raking port 19 is formed in an upper portion of the first side of the slag collecting bin 13; the second slag raking port 19 of the slag collecting unit fixedly communicates with the first slag raking port 18 of the heating unit; the slag collecting unit communicates with the heating unit through a pipeline; and the pipeline is provided with a vacuum valve 16 and a KF (Quick Flange) tee joint 11. Pressure balance between the slag collecting unit and the heating unit can be achieved by externally connecting a vacuum pump or opening a valve. The slag raking unit includes a first raking plate 7, a second raking plate 8 and a raking rod 9; the first raking plate 7 and the second raking plate 8 are detachably fixed to the raking rod 9, the first raking plate 7 is located in the heating unit, the second raking plate 8 is located in the slag collecting unit, and an end of the raking rod 9 is configured to be connected to a transmission device 17; the heating unit is provided with two supporting plates 5 for supporting the first raking plate 7; when the slag raking unit is out of use, the first raking plate 7 is configured to be located on a rightmost side of the heating unit, and the second raking plate 8 is configured to cover the second slag raking port 19 and isolate the slag collecting unit from the heating unit; the raking rod 9 of the slag raking unit is connected to a second sidewall of the slag collecting bin 13 by means of a dynamic seal 10.

In accordance with the embodiment, the feeding unit adopts a screw feeder, which includes a motor 1, a conveying rod 2, a discharging pipe 3, a housing 20 and a feeding port 21; the motor 1 is connected to the conveying rod 2, the conveying rod 2 is located inside the housing 20, a top side of the housing 20 is provided with the feeding port 21, and a portion of a lower side of the housing 20 communicates with a top end of the heating unit through the discharging pipe 3; the conveying rod 2 is the push rod or a screw rod, and supporting bearings are arranged at two ends of the conveying rod 2; and an opening in a tail end, which is connected to the heating unit, of the discharging pipe 3 is enlarged, so as to prevent of causing clogging of the discharging pipe 3 when the vapor rises and condenses at the tail end.

In accordance with the embodiment, the heating furnace of the heating unit is square and is configured to be heated by a resistance wire. And a lining of the heating furnace is made of a corundum filler material.

In accordance with the embodiment, the first slag raking port 18 and the second slag raking port 19 are square; the first slag raking port 18 extends into the second slag raking port 19 and is fixedly connected to the second slag raking port 19 by means of a slag raking port flange 6, a connecting portion between the first slag raking port 18 and the second slag raking port 19 is sealed with a rubber ring.

In accordance with the embodiment, a third sidewall of the slag collecting bin 13 has a predetermined inclination, a viewing port 12 is formed in a top of the slag collecting bin 13, and a heat insulation plate is arranged on the slag discharging port 14, and the heat insulation plate is configured to be taken off during slag discharging.

In accordance with the embodiment, an area of the second raking plate 8 is greater than an area of the first raking plate 7, while a thickness of the first raking plate 7 is greater than a thickness of the second raking plate 8; a right side of the first raking plate 7 and a left side of the second raking plate 8 are both provided with rib structures respectively, and each of the area of the first raking plate 7, so as to prevent severe deformation of the raking plates during long-term operation. And the area of the second raking plate 8 is greater than an area of the slag raking port.

The specific use process of the device for continuous treatment of materials containing volatile components is as follows. During operation of the vacuum system, arsenic-containing materials are preloaded into a stock bin which matches the feeding unit, and then are conveyed into the heating furnace by the screw feeder; and the temperature of the heating furnace is preheated to 600° C., the pressure intensity in the heating furnace is 0.02 Mpa to 0.05 Mpa, and arsenide enters the gas outlet 4 in a gas form at high temperature and is collected by a collecting device. The second slag raking port 19 is sealed by the second raking plate 8, so as to prevent gas from entering the slag collecting unit. The screw feeder stops feeding after continuously feeding for 5 h. The heat preservation for the materials is carried out for 1 h, and then the vacuum valve 16 is opened, and the slag raking unit starts to operate. It can be observed through the viewing port 12 that arsenic-removed slag generated in the heating furnace enters the slag collecting bin 13 through the second slag raking port 19. The slag raking unit returns to an original position after operating for 5 to 10 times, and the vacuum valve 16 is closed. The screw feeder stops feeding after continuously feeding for 10 h. The heat preservation for the materials is carried out for 2 h, and then the vacuum valve 16 is opened. The slag raking unit starts to operate. After the feeding is circulated for 10 times, the second raking plate 8 returns to an original position. The slag discharging port 14 is opened for slag discharging after the slag collecting unit is fully cooled. In a case where the slag cannot be discharged smoothly, it can be observed from the viewing port 12 that a large amount of foam slag in the slag collecting bin 13 is not discharged, then the slag smashing port 15 can be opened to smash the foam slag, thus the slag can be discharged smoothly. The lining of the heating furnace is made of corundum filler, and has corrosion resistance and good heat preservation effect.

EMBODIMENT II

The structure of the device for continuous treatment of materials containing volatile components in this embodiment is identical to that of the device for continuous treatment of materials containing volatile components in the embodiment I, except that a push rod feeder is employed in this embodiment.

The specific operating process of the device for continuous treatment of materials containing volatile components is as follows. The device operates under micro negative pressure (−20 Pa to 100 Pa) and takes black copper sludge as a raw material, and the temperature in the heating furnace is set to be 1000° C. The push rod feeder stops feeding after continuously feeding for 3 h. The heat preservation for the material is carried out for 1 h, and then the slag raking unit starts to operate. The accumulation phenomenon of raked slag in the slag collecting bin is observed through the viewing port 12. After the feeding for the material is circulated for 10 times and the slag collecting bin 12 is sufficiently cooled to 100° C., the slag discharging port 14 is opened. The lining of the heating furnace is made of a SUS310S stainless steel material, and ceramic refractory bricks are laid in the heating furnace for heat insulation.

What is claimed is:

1. A device for continuous treatment of materials containing volatile components, comprising: a feeding unit, a heating unit, a slag raking unit, and a slag collecting unit, wherein the heating unit comprises a heating furnace, a charging port is formed in a top of the heating furnace, and a discharge port of the feeding unit communicates with the charging port of the heating unit; a gas outlet (4) is formed in an upper portion of a first sidewall of the heating unit, a first slag raking port (18) is formed in a lower portion of a second sidewall of the heating unit, and the second sidewall is opposite to the gas outlet (4); and the gas outlet (4) is configured to communicate with a volatile component collecting device;

the slag collecting unit comprises a slag collecting bin (13), a slag discharging port (14) and a slag smashing port (15); the slag discharging port (14) is arranged in a lower portion of the slag collecting bin (13), a first side of the slag collecting bin (13) is provided with the slag smashing port (15), and a second slag raking port (19) is formed in an upper portion of the first side of the slag collecting bin (13); the second slag raking port (19) of the slag collecting unit fixedly communicates with the first slag raking port (18) of the heating unit; the slag collecting unit communicates with the heating unit through a pipeline; and the pipeline is provided with a vacuum valve (16) and a KF tee joint (11);

the slag raking unit comprises a first raking plate (7), a second raking plate (8) and a raking rod (9); the first raking plate (7) and the second raking plate (8) are detachably fixed to the raking rod (9), the first raking plate (7) is located in the heating unit, the second raking plate (8) is located in the slag collecting unit, and an end of the raking rod (9) is configured to be connected to a transmission device (17); the heating unit is provided with two supporting plates (5) for supporting the first raking plate (7); when the slag raking unit is out of use, the first raking plate (7) is configured to be located on a rightmost side of the heating unit, and the second raking plate (8) is configured to cover the second slag raking port (19) and isolate the slag collecting unit from the heating unit; the raking rod (9) of the slag raking unit is connected to a second sidewall of the slag collecting bin (13) by means of a dynamic seal (10).

2. The device for continuous treatment of materials containing volatile components according to claim 1, wherein the feeding unit is configured to feed the materials using a push rod or in a spiral manner.

3. The device for continuous treatment of materials containing volatile components according to claim 2, wherein the feeding unit comprises a motor (1), a conveying rod (2), a discharging pipe (3), a housing (20) and a feeding port (21); the motor (1) is connected to the conveying rod (2), the conveying rod (2) is located inside the housing (20), a top side of the housing (20) is provided with the feeding port (21), and a portion of a lower side of the housing (20) communicates with a top end of the heating unit through the discharging pipe (3); the conveying rod (2) is the push rod or a screw rod, and supporting bearings are arranged at two ends of the conveying rod (2); and an opening in a tail end, which is connected to the heating unit, of the discharging pipe (3) is enlarged.

4. The device for continuous treatment of materials containing volatile components according to claim 1, wherein the heating furnace of the heating unit is square and is configured to be externally heated; and a lining of the heating furnace is made of stainless steel, corundum filler or ceramic refractory brick materials.

5. The device for continuous treatment of materials containing volatile components according to claim 1, wherein the first slag raking port (18) and the second slag raking port (19) are square; the first slag raking port (18) extends into the second slag raking port (19) and is fixedly connected to the second slag raking port (19) by means of a slag raking port flange (6), a connecting portion between the first slag raking port (18) and the second slag raking port (19) is sealed with a rubber ring.

6. The device for continuous treatment of materials containing volatile components according to claim 1, wherein a third sidewall of the slag collecting bin (13) has a predetermined inclination, a viewing port (12) is formed in a top of the slag collecting bin (13), and a heat insulation plate is arranged on the slag discharging port (14), and the heat insulation plate is configured to be taken off during slag discharging.

7. The device for continuous treatment of materials containing volatile components according to claim 1, wherein an area of the second raking plate (8) is greater than an area of the first raking plate (7), while a thickness of the first raking plate (7) is greater than a thickness of the second raking plate (8); a right side of the first raking plate (7) and a left side of the second raking plate (8) are both provided with rib structures respectively, and each of the area of the first raking plate (7) and the area of the second raking plate (8) is greater than an area of the slag raking port.

8. The device for continuous treatment of materials containing volatile components according to claim 4, wherein the heating furnace is configured to be externally heated by a resistance wire or a combustion gas.

9. The device for continuous treatment of materials containing volatile components according to claim 7, wherein a connecting portion of both the pipeline and the slag collecting unit is at a side, away from the heating unit, of the viewing port (12).

* * * * *